United States Patent [19]

Kawakita et al.

[11] Patent Number: 5,093,757

[45] Date of Patent: Mar. 3, 1992

[54] DIELECTRIC CERAMIC COMPOSITION

[75] Inventors: Kouji Kawakita, Joyo; Suzushi Kimura; Hideyuki Okinaka, both of Toyonaka; Youichiro Yokotani, Suita; Mariko Ishikawa, Osaka, all of Japan

[73] Assignee: Matsushita Electric Industrial Co., Ltd., Osaka, Japan

[21] Appl. No.: 649,463

[22] Filed: Feb. 5, 1991

Related U.S. Application Data

[62] Division of Ser. No. 432,880, Nov. 7, 1989.

[51] Int. Cl.$^5$ ............................ H01G 4/10; C04B 35/46
[52] U.S. Cl. ........................................ 361/321; 501/136
[58] Field of Search ............... 361/320, 321; 501/134, 501/138

[56] References Cited

U.S. PATENT DOCUMENTS 4,339,544 7/1982 Sakabe et al. ........................ 501/136
4,711,862 12/1987 Yokotani et al. ..................... 501/134

OTHER PUBLICATIONS

Guha et al., Effect of Excess PbO on the Sintering Characteristics and Dielectric Properties of Pb(Mg$_{\frac{1}{3}}$Nb$_{\frac{2}{3}}$)O$_3$ PbTiO$_3$ Based Ceramics, J. Am. Ceramic Society, Mar. 1988.

Primary Examiner—Donald A. Griffin
Attorney, Agent, or Firm—Wenderoth, Lind & Ponack

[57] ABSTRACT

The invention relates to a dielectric ceramic composition that can be baked in a short time in the atmosphere, neutral atmosphere or reducing atmosphere at baking temperature of 800° to 1000° C. In the ceramic components expressed by PbTi$_X$(Mg$_{\frac{1}{3}}$Nb$_{\frac{2}{3}}$)$_Y$(Ni$_{\frac{1}{2}}$W$_{\frac{1}{2}}$)ZO$_3$ (where X+Y+Z=1), PbO is added by 1.0 to 25.0 mol % and NiO by 1.0 to 15.0 mol % as subsidiary components, to the temporarily baked powder of the main component dielectric ceramic composition composed in the pentagonal region having the vertices at compositions A, B, C, D, E expressed by numerical values in the following square brackets, in the system of trigonometric coordinates having the vertices at PbTiO$_3$, Pb(Mg$_{\frac{1}{3}}$Nb$_{\frac{2}{3}}$)O$_3$ and Pb(Ni$_{\frac{1}{2}}$W$_{\frac{1}{2}}$)O$_3$, A is x=2.5, y=9.5, z=2.5;
B is x=12.5, y=85.0, z=2.5,
C is x=60.0, y=10.0, z=30.0,
D is x=40.0, y=10.0, z=50.0,
E is x=2.5, y=90.0, z=7.5 (where all untis are mol %)

so that a laminate ceramic capacitor or thick film capacitor of large capacity that can be baked densely in a short time at low baking temperature of below 1000° C. will be obtained.

5 Claims, 2 Drawing Sheets

DIELECTRIC CERAMIC COMPOSITION

This application is a divisional application of Ser. No. 432,880 filed on Nov. 7, 1989.

BACKGROUND OF THE INVENTION

The present invention relates to a dielectric ceramic composition of a high dielectric constant system, capable of baking in a short time, at a baking temperature of 800° to 1000° C., in the atmosphere, neutral atmosphere or reducing atmosphere.

As materials of high dielectric constant of ceramic capacitors which are progressively reduced in size and enlarged in capacity, materials mainly composed of barium titanate have been hitherto employed. But to sinter these materials, it is required to bake in the atmosphere at a high temperature of about 1300° C. Therefore, when fabricating laminate ceramic capacitors, expensive noble metals such as platinum and palladium are indispensable as the electrode materials, and in particular along with the capacity increasing trend, the internal electrode material pushed up the material cost.

To the contrary, recently, it has been attempted to lower the cost of the laminate ceramic capacitors by, among others, a method of providing barium titanate material with resistance to reduction, and baking in an atmosphere of low oxygen partial pressure by using an inexpensive base metal as electrode material or a method of baking at a low temperature of about 1000° C. by using a silver-palladium alloy electrode material mainly composed of lead dielectric material and inexpensive silver.

On the other hand, in the electronic appliances where reduction of size and enhancement of reliability are demanded, the hybrid IC of high packaging density is promoted, and the demand for thick film capacitor is mounting to replace the conventional chip capacitor. To fabricate this thick film capacitor, a dielectric capable of baking at low temperature and in a short time is requried, and the lead dielectric is used mainly as its material. Therefore, as the material applicable to both increase of capacity of laminate chip capacitor and increase of thickness of capacity, the lead dielectric is being developed intensively.

Incidentally, $PbTiO_3\text{-}Pb(Mg_{\frac{1}{3}}Nb_{\frac{2}{3}})O_3\text{-}Pb(Ni_{\frac{1}{2}}W_{\frac{1}{2}})O_3$ solid solution and $PbZrO_3\text{-}Pb(Ni_{\frac{1}{3}}Nb_{\frac{2}{3}})O_3\text{-}Pb(Ni_{\frac{1}{2}}W_{\frac{1}{2}})O_3$ solid solution are compositions with high dielectric constnat baked in the atmosphere at 1100° C. or lower temperature as disclosed in the Japanese Patent Laid-Open No. 61-155249 and No. 61-155248, but it is necessary to keep the baking temperature for several hours in order to heighten the dielectric constant and obtain sinters having a sufficiently dense texture. On the other hand, when fabricating a thick film capacitor for hybrid IC, low temperature, short-time baking is indispensable, and these dielectric materials are not sintered completely in such condition, and therefore desired characteristics are not obtained. Still worse, due to heat temperature in neutral or reducing atmosphere for a long time, oxygen defects are likely to occur in the dielectric ceramics, which led to practical problems such as lowering of dielectric constant and reduction of insulation resistance.

SUMMARY OF THE INVENTION

In the light of the above-discussed problems, hence, it is a primary object of the invention to present a dielectric ceramic composition of high dielectric constant, and a ceramic capacitor or thick film capacitor using the same, capable of baking at 800° to 1000° C. in a short time in the atmosphere, neutral atmosphere or reducing atmosphere, without spoiling the high dielectric constant of $PbTiO_3\text{-}Pb(Mg_{\frac{1}{3}}Nb_{\frac{2}{3}})O_3\text{-}Pb(Ni_{\frac{1}{2}}W_{\frac{1}{2}})O_3$ solid solution and $PbZrO_3\text{-}Pb(Ni_{\frac{1}{3}}Nb_{\frac{2}{3}})O_3\text{-}Pb(Ni_{\frac{1}{2}}W_{\frac{1}{2}})O_3$ solid solution.

To achieve the above object, the invention presents a dielectric ceramic composition which possesses the ceramic components expressed as $PbTi_X(Mg_{\frac{1}{3}}Nb_{\frac{2}{3}})Y(Ni_{\frac{1}{2}}W_{\frac{1}{2}})ZO_3$ (where $X+Y+Z=1$), wherein, in the system of trigonometric coordinates having the vertices at $PbTiO_3$, $Pb(Mg_{\frac{1}{3}}Nb_{\frac{2}{3}})O_3$ and $Pb(Ni_{\frac{1}{2}}W_{\frac{1}{2}})O_3$, PbO by 1.0 to 25.0 mol % and NiO or $WO_3$ by 1.0 to 15.0 mol % are added as subsidiary components to the temporarily baked powder of the main components dielectric ceramic composition formed in the pentagonal region having vertices at compositions A, B, C, D, E expressed by the numerical values in the following square brackets.

A is $x=2.5$, $y=95.0$, $z=2.5$;
B is $x=12.5$, $y=85.0$, $z=2.5$,
C is $x=60.0$, $y=10.0$, $z=30.0$;
D is $x=40.0$, $y=10.0$, $z=50.0$,
E is $x=2.5$, $y=90.0$, $z=7.5$ (where all units are mol %).

Also according to the invention in the ceramic components expressed as $PbZr_X(Ni_{\frac{1}{3}}Nb_{\frac{2}{3}})Y(Ni_{\frac{1}{2}}W_{\frac{1}{2}})ZO_3$ (where $X+Y+Z=1$), in the system of trigonometric coordinates having the vertices at $PbZrO_3$, $Pb(Ni_{\frac{1}{3}}Nb_{\frac{2}{3}})O_3$ and $Pb(Ni_{\frac{1}{2}}W_{\frac{1}{2}})O_3$, PbO by 1.0 to 25.0 mol % and NiO by 1.0 to 15.0 mol % are added as subsidiary components to the temporarily baked powder of the main component dielectric ceramic composition formed in the quadrangular region having the vertices at compositions A, B, C, D expressed by the numerical values in the following square brackets.

A is $x=35.0$, $y=60.0$, $z=5.0$,
B is $x=55.0$, $y=40.0$, $z=5.0$,
C is $x=65.0$, $y=20.0$, $z=15.0$,
D is $x=52.5$, $y=20$, $z=27.5$ (wherew all untis are mol %).

In other words, in the dielectric ceramic composition of the invention, by adding PbO and NiO or $WO_3$ to the temporarily baked powder of $PbTiO_3\text{-}Pb(Mg_{\frac{1}{3}}Nb_{\frac{2}{3}})O_3\text{-}Pb(Ni_{\frac{1}{2}}W_{\frac{1}{2}})O_3$ system and $PbZrO_3\text{-}Pb(Ni_{\frac{1}{3}}Nb_{\frac{2}{3}})O_3\text{-}Pb(Ni_{\frac{1}{2}}W_{\frac{1}{2}})O_3$ system having the perovskite structure, a liquid phase is generated at low temperature by making use of the eutectic composition of PbO and NiO, or PbO and $WO_3$, and when these additives are simultaneously solubilized at site A and site B, diffusion into the dielectric is smooth, and formation of grain boundary layer due to additives is suppressed. Threfore, preventing lowering of dielectric constant, it is possibel to obtain laminate ceramic capacitor or thick film capacitor of large capacity capable of baking densely in a short time at a low baking temperature of not more than 1000° C.

The invention will be better understood, along with other obejcts and features thereof, from the following detailed description in conjunction with the drawings.

DETAILED DESCRIPTION OF THE INVENTION

Figure 1:
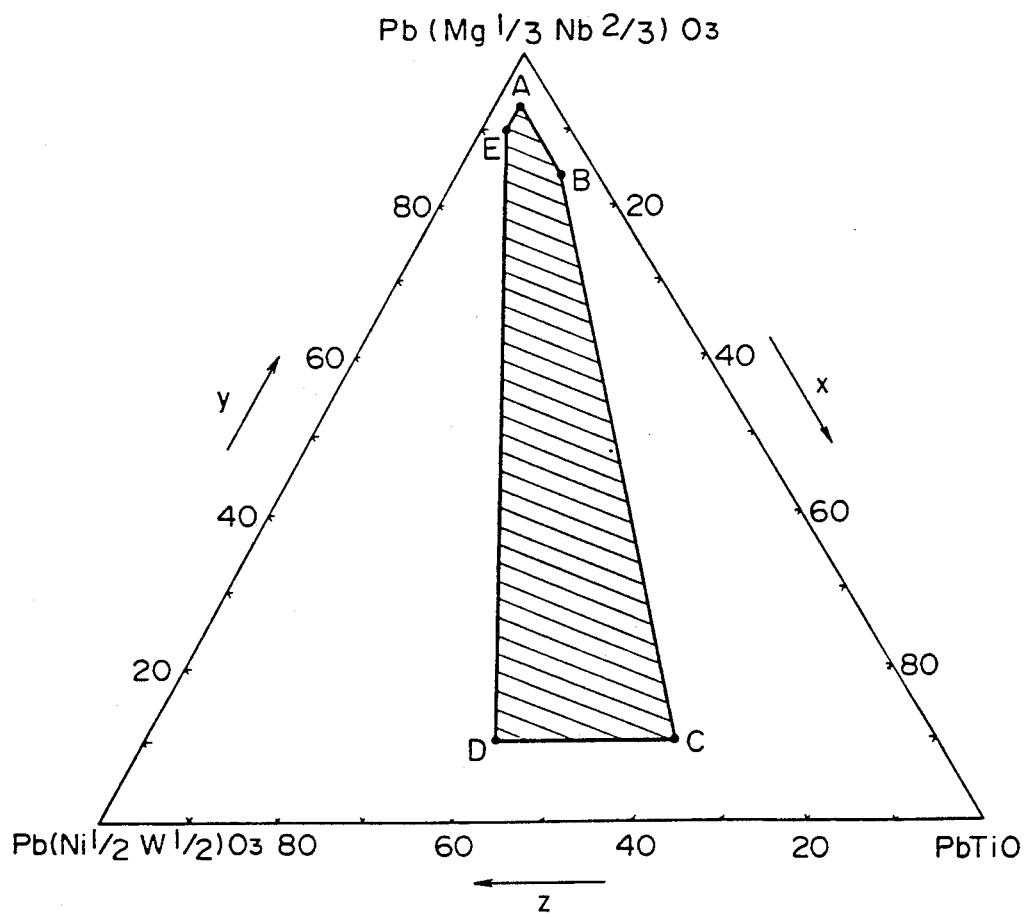
FIG. 1 is a triangular composition diagram mainly composed of $PbTiO_3$, $Pb(Mg_{\frac{1}{3}}Nb_{\frac{2}{3}})O_3$ and $Pb(Ni_{\frac{1}{2}}W_{\frac{1}{2}})O_3$ showing the composition range in one of the embodiments of the invention.

Some of the preferred embodiments of the invention are described in detail below.

EXAMPLE 1

As the starting materials, PbO, MgO, $Nb_2O_5$, $TiO_2$, NiO, and $WO_3$ of chemically high purity were used. After correcting their purity, specified amounts were weighed, and purified water was added, and they were mixed in a ball mill for 17 hours by using agate balls. After separating the majority of water content by suction filtration, the residue was dried, and was sufficiently crushed by an automatic agate mortar, and 5 wt. % of purified water of the powder was added, and the powder was formed into a columnar shape of 60 mm in diameter and about 50 mm in height at forming pressure of 500 kg/cm². It was put in an aluminum crucible, and a lid of same material was put on, and it was temporarily baked at 750° to 1000° C. for 2 hours. This temporarily baked material was coarsely crushed in an alumina mortar, and was further crushed by a ball mill for 17 hours, and was dried after suction filtration. This process of temporary baking, crushing and drying was repeated several time. This pwder was analyzed by X-ray analysis, and the perovskite phase was recognized.

To this dielectric powder, PBO and NiO or $WO_3$ were added as subsidiary components, and were mixed by the automatic agate mortar, polyvinyl alcohol 6 wt. % aqueous solution was added by 6 wt. % of the powder, and was granulated thorough 32-mesh sieve, and was formed into a disk of 13 mm in diameter and about 5 mm in height at a forming pressure of 1000 kg/cm². Next, this forming was kept in a 600° C. atmosphere for 1 hour to get rid of binder, and was put into a magnesia ceramic container and covered with a lid of same material, and it was heated to specified temperature at a rate of 2400° C./hr in the atmosphere, neutral atmosphere or reducing atmosphere, and after holding at the maximum temperature for 5 to 30 minutes, it was cooled at a rate of 2400° C./hr.

Thus obtained baked piece was processed into a disk of 1 mm in thickness, and Cr-Au was evaporated on both side as electrode, and the dielectric constant and tan $\delta$ were measured in the electric field on 1 kHz, 1 V/mm. Table 1 shows the material composition of the invention and the dielectric characteristics of the specimens baked in the atmosphere. The results of 900° C. baking in the baking atmosphere of neutral atmosphere of nitrogen, and in nitrogen-hydrogen mixed gas with the oxygen partial pressure of $10^{-8}$ atm or more are shown in Tables 2 and 3, respectively.

TABLE 1

| No. | Principal dielectric composition | | | Subsidiary component | | | Baking temperature (°C.) | Dielectric constant (20° C.) | tan $\delta$ (20° C.) [%] |
| | $PbTiO_3$ (mol %) | $Pb(Mg_{\frac{1}{3}}Nb_{\frac{2}{3}})O_3$ (mol %) | $Pb(Ni_{\frac{1}{2}}W_{\frac{1}{2}})O_3$ (mol %) | PbO (mol %) | NiO (mol %) | $WO_3$ (mol %) | | | |
|---|---|---|---|---|---|---|---|---|---|
| 1* | 20.0 | 70.0 | 10.0 | 0 | 0 | 0 | 900 | 1920 | 4.5 |
| 2* | 20.0 | 70.0 | 10.0 | 0.5 | 0.5 | 0 | 900 | 3280 | 3.3 |
| 3 | 20.0 | 70.0 | 10.0 | 1.0 | 1.0 | 0 | 900 | 8950 | 3.9 |
| 4 | 20.0 | 70.0 | 10.0 | 10.0 | 5.0 | 0 | 900 | 13500 | 4.8 |
| 5 | 20.0 | 70.0 | 10.0 | 25.0 | 15.0 | 0 | 900 | 9680 | 3.9 |
| 6* | 20.0 | 70.0 | 10.0 | 30.0 | 25.0 | 0 | 900 | 4810 | 3.5 |
| 7 | 2.5 | 95.0 | 2.5 | 10.0 | 5.0 | 0 | 900 | 8520 | 4.3 |
| 8 | 12.5 | 85.0 | 2.5 | 10.0 | 5.0 | 0 | 900 | 10500 | 3.8 |
| 9 | 60.0 | 10.0 | 30.0 | 10.0 | 5.0 | 0 | 900 | 6360 | 4.1 |
| 10 | 40.0 | 10.0 | 50.0 | 10.0 | 5.0 | 0 | 900 | 6880 | 1.5 |
| 11 | 2.5 | 90.0 | 7.5 | 10.0 | 5.0 | 0 | 900 | 7130 | 1.2 |
| 12* | 20.0 | 70.0 | 10.0 | 0.5 | 0 | 0.5 | 900 | 3300 | 5.0 |
| 13 | 20.0 | 70.0 | 10.0 | 1.0 | 0 | 1.0 | 900 | 8720 | 4.0 |
| 14 | 20.0 | 70.0 | 10.0 | 10.0 | 0 | 5.0 | 900 | 8550 | 3.5 |
| 15 | 20.0 | 70.0 | 10.0 | 25.0 | 0 | 15.0 | 900 | 7640 | 3.0 |
| 16* | 20.0 | 70.0 | 10.0 | 30.0 | 0 | 25.0 | 900 | 4360 | 3.9 |
| 17 | 2.5 | 95.0 | 2.5 | 10.0 | 0 | 5.0 | 900 | 7670 | 2.6 |
| 18 | 12.5 | 85.0 | 2.5 | 10.0 | 0 | 5.0 | 900 | 10260 | 2.9 |
| 19 | 60.0 | 10.0 | 30.0 | 10.0 | 0 | 5.0 | 900 | 6810 | 2.6 |
| 20 | 40.0 | 10.0 | 50.0 | 10.0 | 0 | 5.0 | 900 | 7280 | 1.8 |
| 21 | 2.5 | 90.0 | 7.5 | 10.0 | 0 | 5.0 | 900 | 6950 | 2.0 |
| 22* | 20.0 | 70.0 | 10.0 | 10.0 | 5.0 | 0 | 750 | 3650 | 8.5 |
| 23 | 20.0 | 70.0 | 10.0 | 10.0 | 5.0 | 0 | 800 | 6280 | 7.6 |
| 24 | 20.0 | 70.0 | 10.0 | 10.0 | 5.0 | 0 | 850 | 7300 | 5.3 |
| 25 | 20.0 | 70.0 | 10.0 | 10.0 | 5.0 | 0 | 950 | 12030 | 4.3 |
| 26 | 20.0 | 70.0 | 10.0 | 10.0 | 5.0 | 0 | 1000 | 7600 | 6.0 |
| 27* | 20.0 | 70.0 | 10.0 | 10.0 | 5.0 | 0 | 1050 | 4530 | 7.8 |
| 28* | 20.0 | 70.0 | 10.0 | 10.0 | 0 | 5.0 | 750 | 2860 | 9.3 |
| 29 | 20.0 | 70.0 | 10.0 | 10.0 | 0 | 5.0 | 800 | 5620 | 8.6 |
| 30 | 20.0 | 70.0 | 10.0 | 10.0 | 0 | 5.0 | 850 | 6030 | 5.5 |
| 31 | 20.0 | 70.0 | 10.0 | 10.0 | 0 | 5.0 | 950 | 9780 | 4.8 |
| 32 | 20.0 | 70.0 | 10.0 | 10.0 | 0 | 5.0 | 1000 | 6830 | 3.9 |
| 33* | 20.0 | 70.0 | 10.0 | 10.0 | 0 | 5.0 | 1050 | 4320 | 5.9 |

*The asterisked specimens are reference examples.

TABLE 2

| No. | Principal dielectric composition PbTiO₃ (mol %) | Pb(Mg₁Nb₂)O₃ (mol %) | Pb(Ni₁W₂)O₃ (mol %) | Subsidiary component PbO (mol %) | NiO (mol %) | WO₃ (mol %) | Dielectric constant (20° C.) | tan δ (20° C.) [%] |
|---|---|---|---|---|---|---|---|---|
| 1* | 20.0 | 70.0 | 10.0 | 0 | 0 | 0 | 1720 | 6.5 |
| 2* | 20.0 | 70.0 | 10.0 | 0.5 | 0.5 | 0 | 3070 | 5.3 |
| 3 | 20.0 | 70.0 | 10.0 | 1.0 | 1.0 | 0 | 9020 | 6.2 |
| 4 | 20.0 | 70.0 | 10.0 | 10.0 | 5.0 | 0 | 12250 | 6.9 |
| 5 | 20.0 | 70.0 | 10.0 | 25.0 | 15.0 | 0 | 8860 | 5.0 |
| 6* | 20.0 | 70.0 | 10.0 | 30.0 | 25.0 | 0 | 3520 | 5.3 |
| 7 | 2.5 | 95.0 | 2.5 | 10.0 | 5.0 | 0 | 8790 | 6.8 |
| 8 | 12.5 | 85.0 | 2.5 | 10.0 | 5.0 | 0 | 11220 | 6.0 |
| 9 | 60.0 | 10.0 | 30.0 | 10.0 | 5.0 | 0 | 6000 | 5.2 |
| 10 | 40.0 | 10.0 | 50.0 | 10.0 | 5.0 | 0 | 6380 | 3.5 |
| 11 | 2.5 | 90.0 | 7.5 | 10.0 | 5.0 | 0 | 6820 | 2.3 |
| 12* | 20.0 | 70.0 | 10.0 | 0.5 | 0 | 0.5 | 2650 | 5.0 |
| 13 | 20.0 | 70.0 | 10.0 | 1.0 | 0 | 1.0 | 9010 | 4.5 |
| 14 | 20.0 | 70.0 | 10.0 | 10.0 | 0 | 5.0 | 10660 | 6.2 |
| 15 | 20.0 | 70.0 | 10.0 | 25.0 | 0 | 15.0 | 7650 | 6.3 |
| 16* | 20.0 | 70.0 | 10.0 | 30.0 | 0 | 25.0 | 3960 | 8.2 |
| 17 | 2.5 | 95.0 | 2.5 | 10.0 | 0 | 5.0 | 7570 | 3.6 |
| 18 | 12.5 | 85.0 | 2.5 | 10.0 | 0 | 5.0 | 10580 | 3.8 |
| 19 | 60.0 | 10.0 | 30.0 | 10.0 | 0 | 5.0 | 6660 | 3.9 |
| 20 | 40.0 | 10.0 | 50.0 | 10.0 | 0 | 5.0 | 7080 | 1.8 |
| 21 | 2.5 | 90.0 | 7.5 | 10.0 | 0 | 5.0 | 7060 | 2.0 |

*The asterisked specimens are reference examples.

TABLE 3

| No. | Principal dielectric composition PbTiO₃ (mol %) | Pb(Mg₁Nb₂)O₃ (mol %) | Pb(Ni₁W₂)O₃ (mol %) | Subsidiary component PbO (mol %) | NiO (mol %) | WO₃ (mol %) | Dielectric constant (20° C.) | tan δ (20° C.) [%] |
|---|---|---|---|---|---|---|---|---|
| 1* | 20.0 | 70.0 | 10.0 | 0 | 0 | 0 | 1520 | 8.0 |
| 2* | 20.0 | 70.0 | 10.0 | 0.5 | 0.5 | 0 | 3060 | 7.8 |
| 3 | 20.0 | 70.0 | 10.0 | 1.0 | 1.0 | 0 | 7950 | 5.9 |
| 4 | 20.0 | 70.0 | 10.0 | 10.0 | 5.0 | 0 | 9860 | 5.1 |
| 5 | 20.0 | 70.0 | 10.0 | 25.0 | 15.0 | 0 | 8680 | 5.3 |
| 6* | 20.0 | 70.0 | 10.0 | 30.0 | 25.0 | 0 | 3950 | 5.9 |
| 7 | 2.5 | 95.0 | 2.5 | 10.0 | 5.0 | 0 | 7960 | 6.0 |
| 8 | 12.5 | 85.0 | 2.5 | 10.0 | 5.0 | 0 | 9890 | 6.3 |
| 9 | 60.0 | 10.0 | 30.0 | 10.0 | 5.0 | 0 | 6420 | 8.6 |
| 10 | 40.0 | 10.0 | 50.0 | 10.0 | 5.0 | 0 | 6350 | 3.5 |
| 11 | 2.5 | 90.0 | 7.5 | 10.0 | 5.0 | 0 | 7090 | 2.9 |
| 12* | 20.0 | 70.0 | 10.0 | 0.5 | 0 | 0.5 | 3070 | 5.2 |
| 13 | 20.0 | 70.0 | 10.0 | 1.0 | 0 | 1.0 | 8360 | 4.8 |
| 14 | 20.0 | 70.0 | 10.0 | 10.0 | 0 | 5.0 | 8500 | 4.3 |
| 15 | 20.0 | 70.0 | 10.0 | 25.0 | 0 | 15.0 | 7840 | 4.9 |
| 16* | 20.0 | 70.0 | 10.0 | 30.0 | 0 | 25.0 | 3960 | 5.6 |
| 17 | 2.5 | 95.0 | 2.5 | 10.0 | 0 | 5.0 | 6670 | 4.3 |
| 18 | 12.5 | 85.0 | 2.5 | 10.0 | 0 | 5.0 | 10020 | 4.6 |
| 19 | 60.0 | 10.0 | 30.0 | 10.0 | 0 | 5.0 | 6320 | 2.6 |
| 20 | 40.0 | 10.0 | 50.0 | 10.0 | 0 | 5.0 | 6940 | 2.3 |
| 21 | 2.5 | 90.0 | 7.5 | 10.0 | 0 | 5.0 | 6720 | 1.9 |

*The asterisked specimens are reference examples.

As shown in Tables 1 to 3, in the material composition of the invention, in spite of short-time sintering at 900° C., and in various atmospheres, dense baked bodies of high dielectric constant were obtained.

In FIG. 1, the composition range of the principal components of the invention are shown in the triangular composition diagram mainly composed of $PbTiO_3$, $Pb(Mg_{\frac{1}{3}}Nb_{\frac{2}{3}})O_3$ and $Pb(Ni_{\frac{1}{2}}W_{\frac{1}{2}})O_3$.

Here, the reason of specifically defining the claims of the invention as: the ceramic components expressed as $PbTi_X(Mg_{\frac{1}{3}}Nb_{\frac{2}{3}})_Y(Ni_{\frac{1}{2}}W_{\frac{1}{2}})_ZO_3$ (where $X+Y+Z=1$), wherein, in the system of trigonometric coordinates having the vertices at $PbTiO_3$, $Pb(Mg_{\frac{1}{3}}Nb_{\frac{2}{3}})O_3$ and $Pb(Ni_{\frac{1}{2}}W_{\frac{1}{2}})O_3$, PbO by 1.0 to 25.0 mol % and NiO or $WO_3$ by 1.0 to 15.0 mol % are added as subsidiary components to the temporarily baked powder of the main components dielectric ceramic composition formed in the pentagonal region having vertices at compositions A, B, C, D, E expressed by the numerical values in the following square brackets.

A is x=2.5, y=95.0, z=2.5,
B is x=12.5, y=85.0, z=2.5,
C is x=60.0, y=10.0, z=30.0,
D is x=40, y=10.0, z=50.0,
E is x=2.5, y=90.0, z=7.5 (where all units are mol %).

is that the sintering is insufficient as the dielectric constant of the sinters at the baking temperature of 900° C. is less than 5000 in the composition outside the specified range as indicated by reference examples shown in Tables 1 to 3. Besides, at baking temperature of 800° C. or less, the sintering is insufficient, and at 1000° C. or higher, the dielectric constant is lowered, and described characteristics may not be obtained.

EXAMPLE 2

Similarly to Example 1, to the dielectric powder temporarily baked, crushed and dried, PbO and NiO or $WO_3$ were added as subsidiary components, and were mixed in wet process by the ball mill, and the mixture was dried, and a vehicle having a resin mainly made of ethyl cellulose dissolved in solvent was added, and the compound was kneaded in three-stage rolls, and a dielectric paste was prepared. On the other hand, in order to form a thick film capacity of $2 \times 2$ mm$^2$ on an alumina substrate of 96% purity, a copper electrode was printed and dried as the lower electrode, and the obtained dielectric paste was printed and dried in a thickness of 50 to 60 $\mu$m as the dielectric layer in two steps, and a same copper electrode as the lower electrode was pritned and dried as the upper electrode, thereby forming a three-layer printed thick film consisting of electrode, dielectric and electrode, and it was baked in a nitrogen atmosphere at a maximum temperature of 800° to 1000° C., for 5 to 30 minutes, in a belt furnace. The dielectric constant and tan $\delta$ of thus obtained thick film capacitor were measured in the electric field of 1 kHz, 1 V/mm. The material composition of the invention and the dielectric characteristics of the specimens baked at 900° C. in nitrogen are shown in Table 4.

TABLE 4

| No. | Principal dielectric composition | | | Subsidiary component | | | Dielectric constant (20° C.) | tan $\delta$ (20° C.) [%] |
|---|---|---|---|---|---|---|---|---|
| | PbTiO$_3$ (mol %) | Pb(Mg$_\frac{1}{3}$Nb$_\frac{2}{3}$)O$_3$ (mol %) | Pb(Ni$_\frac{1}{2}$W$_\frac{1}{2}$)O$_3$ (mol %) | PbO (mol %) | NiO (mol %) | WO$_3$ (mol %) | | |
| 1* | 20.0 | 70.0 | 10.0 | 0 | 0 | 0 | 1530 | 8.9 |
| 2* | 20.0 | 70.0 | 10.0 | 0.5 | 0.5 | 0 | 2980 | 6.8 |
| 3 | 20.0 | 70.0 | 10.0 | 1.0 | 1.0 | 0 | 7620 | 5.8 |
| 4 | 20.0 | 70.0 | 10.0 | 10.0 | 5.0 | 0 | 8320 | 4.8 |
| 5 | 20.0 | 70.0 | 10.0 | 25.0 | 15.0 | 0 | 6250 | 4.2 |
| 6* | 20.0 | 70.0 | 10.0 | 30.0 | 25.0 | 0 | 3500 | 6.2 |
| 7 | 2.5 | 95.0 | 2.5 | 10.0 | 5.0 | 0 | 6360 | 5.3 |
| 8 | 12.5 | 85.0 | 2.5 | 10.0 | 5.0 | 0 | 6950 | 4.9 |
| 9 | 60.0 | 10.0 | 30.0 | 10.0 | 5.0 | 0 | 5260 | 4.9 |
| 10 | 40.0 | 10.0 | 50.0 | 10.0 | 5.0 | 0 | 5100 | 3.9 |
| 11 | 2.5 | 90.0 | 7.5 | 10.0 | 5.0 | 0 | 5120 | 2.9 |
| 12* | 20.0 | 70.0 | 10.0 | 0.5 | 0 | 0.5 | 2970 | 5.6 |
| 13 | 20.0 | 70.0 | 10.0 | 1.0 | 0 | 1.0 | 6980 | 5.8 |
| 14 | 20.0 | 70.0 | 10.0 | 10.0 | 0 | 5.0 | 7930 | 4.9 |
| 15 | 20.0 | 70.0 | 10.0 | 25.0 | 0 | 15.0 | 6240 | 3.7 |
| 16* | 20.0 | 70.0 | 10.0 | 30.0 | 0 | 25.0 | 2360 | 7.9 |
| 17 | 2.5 | 95.0 | 2.5 | 10.0 | 0 | 5.0 | 6670 | 3.8 |
| 18 | 12.5 | 85.0 | 2.5 | 10.0 | 0 | 5.0 | 7680 | 3.3 |
| 19 | 60.0 | 10.0 | 30.0 | 10.0 | 0 | 5.0 | 5390 | 2.8 |
| 20 | 40.0 | 10.0 | 50.0 | 10.0 | 0 | 5.0 | 6020 | 2.6 |
| 21 | 2.5 | 90.0 | 7.5 | 10.0 | 0 | 5.0 | 5020 | 9.0 |

*The asterisked specimens are reference examples.

As shown in Table 4, by using the baked materials of the material composition of the invention, thick film capacitors of high dielectric constant made of dense sinters were obtained in sptie of short-time, low-temperature sintering.

The reason of specifying the claims is same as in Example 1, that is, the dielectric constant of the sinters are less than 5000 at the baking temperature of 800° to 1000° C. and the sintering in sufficient in the compositions other than in the defined range as indicated by reference examples in Table 4.

In this embodiment, it is shown that baking is possible in nitrogen, but it may be easily estimated that baking is also possible in neutral atmosphere of argon, helium or the like.

Meanwhile, as the electrodes used in the invention, the electrodes that can be baked at 800° to 1000° C. in the atmosphere, neutral atmosphere or reducing atmosphere may be properly selected and used.

EXAMPLE 3

As the starting materials, PbO, $ZrO_2$, $Nb_2O_5$, NiO and $WO_3$ of chemically high purity were used. They were processed in the same manner as in Example 1, and a dielectric powder was prepared.

To this dielectric powder, PbO and NiO or $WO_3$ were added as subsidiary components, and were mixed by automatic agate mortar, and polyvinyl alcohol 6 wt. % aqueous solution was added by 6 wt. % of the powder, and the mixture was granulated through a 32-mesh sieve, and was formed into a disk of 13 mm in diameter and about 5 mm in height at a forming pressure of 1000 kg/cm$^2$. This forming was held in 600° C. atmosphere for 1 hour to get rid of binder, and was put in a magnesia ceramic container and closed with a lid of same material, and it was heated to specified temperature in the atmosphere, neutral atmosphere or reducing atmosphere at a rate of 2400° C./hr, and after holding at the maximum temperature for 5 to 30 minutes, it was cooled at a rate of 2400° C./hr.

Thus obtained baked piece was processed into a disk of 1 mm in thickness, and C-Au was evaporated on both sides as electrode, and the dielectric constant and tan $\delta$ were measured in the electric field of 1 kHz, 1 V/mm. Table 5 shows the material composition of the invention and the dielectric characteristics of the specimens baked in the atmosphere. The results of 900° C. baking in the baking atmosphere of neutral atmosphere of nitrogen, and in nitrogen-hydrogen mixed gas with the oxygen partical pressure of $10^{-8}$ atm or more are shown in Tables 6 and 7, respectively.

TABLE 5

| No. | Principal dielectric composition | | | Subsidiary component | | | Baking temperature (°C.) | Dielectric constant (20° C.) | tan δ (20° C.) [%] |
| --- | --- | --- | --- | --- | --- | --- | --- | --- | --- |
| | PbZrO$_3$ (mol %) | Pb(Ni$_\frac{1}{3}$Nb$_\frac{2}{3}$)O$_3$ (mol %) | Pb(Ni$_\frac{1}{2}$W$_\frac{1}{2}$)O$_3$ (mol %) | PbO (mol %) | NiO (mol %) | WO$_3$ (mol %) | | | |
| 1* | 55.0 | 30.0 | 15.0 | 0 | 0 | 0 | 900 | 1280 | 8.9 |
| 2* | 55.0 | 30.0 | 15.0 | 0.5 | 0.5 | 0 | 900 | 2400 | 7.2 |
| 3 | 55.0 | 30.0 | 15.0 | 1.0 | 1.0 | 0 | 900 | 4750 | 6.3 |
| 4 | 55.0 | 30.0 | 15.0 | 10.0 | 5.0 | 0 | 900 | 8200 | 6.5 |
| 5 | 55.0 | 30.0 | 15.0 | 25.0 | 15.0 | 0 | 900 | 5020 | 5.9 |
| 6* | 55.0 | 30.0 | 15.0 | 30.0 | 25.0 | 0 | 900 | 2900 | 5.7 |
| 7 | 35.0 | 60.0 | 5.0 | 10.0 | 5.0 | 0 | 900 | 8420 | 3.2 |
| 8 | 55.0 | 40.0 | 5.0 | 10.0 | 5.0 | 0 | 900 | 6130 | 5.8 |
| 9 | 55.0 | 20.0 | 15.0 | 10.0 | 5.0 | 0 | 900 | 6030 | 5.0 |
| 10 | 52.0 | 20.0 | 27.0 | 10.0 | 5.0 | 0 | 900 | 5840 | 2.2 |
| 11* | 55.0 | 30.0 | 15.0 | 0.5 | 0 | 0.5 | 900 | 1780 | 6.3 |
| 12 | 55.0 | 30.0 | 15.0 | 1.0 | 0 | 1.0 | 900 | 4020 | 5.8 |
| 13 | 55.0 | 30.0 | 15.0 | 10.0 | 0 | 5.0 | 900 | 7280 | 5.5 |
| 14 | 55.0 | 30.0 | 15.0 | 25.0 | 0 | 15.0 | 900 | 4050 | 4.8 |
| 15* | 55.0 | 30.0 | 15.0 | 30.0 | 0 | 25.0 | 900 | 2530 | 5.0 |
| 16 | 35.0 | 60.0 | 5.0 | 10.0 | 0 | 5.0 | 900 | 7540 | 2.7 |
| 17 | 55.0 | 40.0 | 5.0 | 10.0 | 0 | 5.0 | 900 | 5900 | 4.8 |
| 18 | 65.0 | 20.0 | 15.0 | 10.0 | 0 | 5.0 | 900 | 5750 | 5.0 |
| 19 | 52.5 | 20.0 | 27.5 | 10.0 | 0 | 5.0 | 900 | 5020 | 1.8 |
| 20* | 55.0 | 30.0 | 15.0 | 10.0 | 5.0 | 0 | 750 | 2900 | 12.3 |
| 21 | 55.0 | 30.0 | 15.0 | 10.0 | 5.0 | 0 | 800 | 4430 | 8.2 |
| 22 | 55.0 | 30.0 | 15.0 | 10.0 | 5.0 | 0 | 850 | 7090 | 7.2 |
| 23 | 55.0 | 30.0 | 15.0 | 10.0 | 5.0 | 0 | 950 | 8070 | 6.5 |
| 24 | 55.0 | 30.0 | 15.0 | 10.0 | 5.0 | 0 | 1000 | 5710 | 6.8 |
| 25* | 55.0 | 30.0 | 15.0 | 10.0 | 5.0 | 0 | 1050 | 2240 | 8.8 |
| 26* | 55.0 | 30.0 | 15.0 | 10.0 | 0 | 5.0 | 750 | 1940 | 14.8 |
| 27 | 55.0 | 30.0 | 15.0 | 10.0 | 0 | 5.0 | 800 | 4860 | 8.8 |
| 28 | 55.0 | 30.0 | 15.0 | 10.0 | 0 | 5.0 | 850 | 6400 | 5.9 |
| 29 | 55.0 | 30.0 | 15.0 | 10.0 | 0 | 5.0 | 950 | 7240 | 5.2 |
| 30 | 55.0 | 30.0 | 15.0 | 10.0 | 0 | 5.0 | 1000 | 5200 | 6.3 |
| 31* | 55.0 | 30.0 | 15.0 | 10.0 | 0 | 5.0 | 1050 | 1080 | 8.8 |

*The asterisked specimens are reference examples.

TABLE 6

| No. | Principal dielectric composition | | | Subsidiary component | | | Dielectric constant (20° C.) | tan δ (20° C.) [%] |
| --- | --- | --- | --- | --- | --- | --- | --- | --- |
| | PbZrO$_3$ (mol %) | Pb(Ni$_\frac{1}{3}$Nb$_\frac{2}{3}$)O$_3$ (mol %) | Pb(Ni$_\frac{1}{2}$W$_\frac{1}{2}$)O$_3$ (mol %) | PbO (mol %) | NiO (mol %) | WO$_3$ (mol %) | | |
| 1* | 55.0 | 30.0 | 15.0 | 0 | 0 | 0 | 1380 | 8.5 |
| 2* | 55.0 | 30.0 | 15.0 | 0.5 | 0.5 | 0 | 2320 | 8.2 |
| 3 | 55.0 | 30.0 | 15.0 | 1.0 | 1.0 | 0 | 4540 | 7.2 |
| 4 | 55.0 | 30.0 | 15.0 | 10.0 | 5.0 | 0 | 7960 | 6.8 |
| 5 | 55.0 | 30.0 | 15.0 | 25.0 | 15.0 | 0 | 5080 | 5.8 |
| 6* | 55.0 | 30.0 | 15.0 | 30.0 | 25.0 | 0 | 3890 | 5.9 |
| 7 | 35.0 | 60.0 | 5.0 | 10.0 | 5.0 | 0 | 8000 | 3.5 |
| 8 | 55.0 | 40.0 | 5.0 | 10.0 | 5.0 | 0 | 6300 | 5.5 |
| 9 | 65.0 | 20.0 | 15.0 | 10.0 | 5.0 | 0 | 5580 | 4.9 |
| 10 | 52.5 | 20.0 | 27.5 | 10.0 | 5.0 | 0 | 5800 | 1.9 |
| 11* | 55.0 | 30.0 | 15.0 | 0.5 | 0 | 0.5 | 1520 | 7.2 |
| 12 | 55.0 | 30.0 | 15.0 | 1.0 | 0 | 1.0 | 4350 | 6.6 |
| 13 | 55.0 | 30.0 | 15.0 | 10.0 | 0 | 5.0 | 7030 | 5.8 |
| 14 | 55.0 | 30.0 | 15.0 | 25.0 | 0 | 15.0 | 4850 | 5.0 |
| 15* | 55.0 | 30.0 | 15.0 | 30.0 | 0 | 25.0 | 3100 | 5.0 |
| 16 | 35.0 | 60.0 | 5.0 | 10.0 | 0 | 5.0 | 6920 | 3.0 |
| 17 | 55.0 | 40.0 | 5.0 | 10.0 | 0 | 5.0 | 6070 | 4.8 |
| 18 | 65.0 | 20.0 | 15.0 | 10.0 | 0 | 5.0 | 5550 | 5.2 |
| 19 | 52.5 | 20.0 | 27.5 | 10.0 | 0 | 5.0 | 4910 | 2.0 |

*The asterisked specimens are reference examples.

TABLE 7

| No. | Principal dielectric composition | | | Subsidiary component | | | Dielectric constant (20° C.) | tan δ (20° C.) [%] |
| --- | --- | --- | --- | --- | --- | --- | --- | --- |
| | PbZrO$_3$ (mol %) | Pb(Ni$_\frac{1}{3}$Nb$_\frac{2}{3}$)O$_3$ (mol %) | Pb(Ni$_\frac{1}{2}$W$_\frac{1}{2}$)O$_3$ (mol %) | PbO (mol %) | NiO (mol %) | WO$_3$ (mol %) | | |
| 1 | 55.0 | 30.0 | 15.0 | 0 | 0 | 0 | 1080 | 9.2 |
| 2 | 55.0 | 30.0 | 15.0 | 0.5 | 0.5 | 0 | 2520 | 10.3 |
| 3 | 55.0 | 30.0 | 15.0 | 1.0 | 1.0 | 0 | 4320 | 8.2 |
| 4 | 55.0 | 30.0 | 15.0 | 10.0 | 5.0 | 0 | 7530 | 8.3 |
| 5 | 55.0 | 30.0 | 15.0 | 25.0 | 15.0 | 0 | 5130 | 6.2 |

TABLE 7-continued

| No. | Principal dielectric composition | | | Subsidiary component | | | Dielectric constant (20° C.) | tan δ (20° C.) [%] |
|---|---|---|---|---|---|---|---|---|
| | PbZrO₃ (mol %) | Pb(Ni⅓Nb⅔)O₃ (mol %) | Pb(Ni½W½)O₃ (mol %) | PbO (mol %) | NiO (mol %) | WO₃ (mol %) | | |
| 6* | 55.0 | 30.0 | 15.0 | 30.0 | 25.0 | 0 | 3900 | 6.3 |
| 7 | 35.0 | 60.0 | 5.0 | 10.0 | 5.0 | 0 | 7830 | 4.0 |
| 8 | 55.0 | 40.0 | 5.0 | 10.0 | 5.0 | 0 | 6210 | 5.2 |
| 9 | 65.0 | 20.0 | 15.0 | 10.0 | 5.0 | 0 | 5400 | 4.9 |
| 10 | 52.5 | 20.0 | 27.5 | 10.0 | 5.0 | 0 | 5130 | 1.8 |
| 11* | 55.0 | 30.0 | 15.0 | 0.5 | 0 | 0.5 | 1330 | 8.4 |
| 12 | 55.0 | 30.0 | 15.0 | 1.0 | 0 | 1.0 | 4430 | 8.0 |
| 13 | 55.0 | 30.0 | 15.0 | 10.0 | 0 | 5.0 | 7170 | 7.7 |
| 14 | 55.0 | 30.0 | 15.0 | 25.0 | 0 | 15.0 | 4380 | 8.5 |
| 15* | 55.0 | 30.0 | 15.0 | 30.0 | 0 | 25.0 | 3100 | 6.8 |
| 16 | 35.0 | 60.0 | 5.0 | 10.0 | 0 | 5.0 | 6740 | 4.2 |
| 17 | 55.0 | 40.0 | 5.0 | 10.0 | 0 | 5.0 | 5890 | 4.9 |
| 18 | 65.0 | 20.0 | 15.0 | 10.0 | 0 | 5.0 | 5500 | 4.9 |
| 19 | 52.5 | 20.0 | 27.5 | 10.0 | 0 | 5.0 | 5410 | 2.2 |

*The asterisked specimens are reference examples.

As shown in Tables 5 to 7, in the material composition of the invention, in spite of short-time sintering at 900° C., and in various atmospheres, dense baked bodies of high dielectric constant were obtained.

Figure 2:
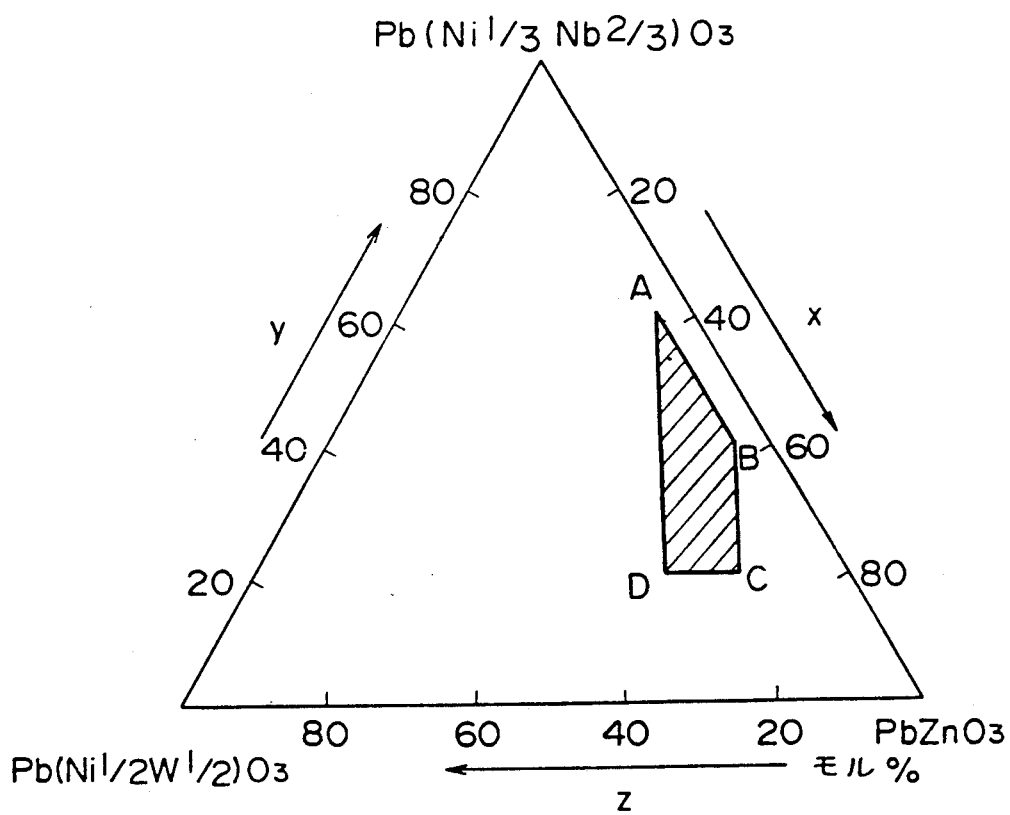
FIG. 2 is a triangular composition diagram mainly composed of $PbZrO_3$, $Pb(Ni_{\frac{1}{3}}Nb_{\frac{2}{3}})O_3$ and $Pb(Ni_{\frac{1}{2}}W_{\frac{1}{2}})O_3$ showing the composition range in other embodiment of the invention.

In FIG. 2, the composition range of the principal components of the invention is shown in the triangular composition diagram mainly composed of $PbZrO_3$, $Pb(Ni_{\frac{1}{3}}Nb_{\frac{2}{3}})O_3$ and $Pb(Ni_{\frac{1}{2}}W_{\frac{1}{2}})O_3$.

Here, the reason of specifically defining the claims of the invention as: the ceramic components expressed as $PbZr_X(Ni_{\frac{1}{3}}Nb_{\frac{2}{3}})Y(Ni_{\frac{1}{2}}W_{\frac{1}{2}})ZO_3$ (where $X+Y+Z=1$), in the system of trigonometric coordinates having the vertices at $PbZrO_3$, $Pb(Ni_{\frac{1}{3}}Nb_{\frac{2}{3}})O_3$ and $Pb(Ni_{\frac{1}{2}}W_{\frac{1}{2}})O_3$, PbO by 1.0 to 25.0 mol % and NiO by 1.0 to 15.0 mol % are added as subsidiary compoennts to the temporarily baked powder of the main component dielectric ceramic composition formed in the quadrangular region having the vertices at compositions A, B, C, D expressed by the numerical values in the following square brackets.

A is $x=35.0$, $y=60.0$, $z=5.0$,
B is $x=55.0$, $y=40.0$, $z=5.0$,
C is $x=65.0$, $y=20.0$, $z=15.0$,
D is $x=52.5$, $y=20.0$, $z=27.5$ (where all units are mol %).
is that the sintering is insufficient as the dielectric constant of the sinters at the baking temperature of 900° C. is less than 5000 in the composition outside the specified range as indciated by reference examples shown in Tables 5 to 7. Besides, at baking temperature of 800° C. or less, the sintering in insufficient, and at 1000° C. or higher, the dielectric constant is lowered, and desired characteristics may not be obtained.

EXAMPLE 4

Similarly to Example 3, to the dielectric powder temporarily baked, crushed and dried, PbO and NiO or WO₃ were added as subsidiary components, and were mixed in wet process by the ball mill, and the mixture was dried, and a vehicle having a resin mainly made of ethyl cellulose dissolved in solvent was added, and the compound was kneaded in three-stage rolls, and a dielectric paste was prepared. On the other hand, in order to form a thick film capacity of $2\times 2$ mm² on an alumina substrate of 96% purity, a copper electrode was printed and dried as the lower electrode, and the obtained dielectric paste was printed and dried in a thickness of 50 to 60 μm as the dielectric layer in two steps, and a same copper electrode as the lower electrode was pritned and dried as the upper electrode, thereby forming a three-layer printed thick film consisting of electrode, dielectric and electrode, and it was baked in a nitrogen atmosphere at a maximum temperature of 800° to 1000° C., for 5 to 30 minutes, in a belt furnace. The dielectric constant and tan δ of thus obtained thick film capacitor were measured in the electric field of 1 kHz, 1 V/mm. The material composition of the invention and the dielectric characteristics of the specimens baked at 900° C. in nitrogen are shown in Table 8.

TABLE 8

| No. | Principal dielectric composition | | | Subsidiary component | | | Dielectric constant (20° C.) | tan δ (20° C.) [%] |
|---|---|---|---|---|---|---|---|---|
| | PbZrO₃ (mol %) | Pb(Ni⅓Nb⅔)O₃ (mol %) | Pb(Ni½W½)O₃ (mol %) | PbO (mol %) | NiO (mol %) | WO₃ (mol %) | | |
| 1* | 55.0 | 30.0 | 15.0 | 0 | 0 | 0 | 1200 | 12.3 |
| 2* | 55.0 | 30.0 | 15.0 | 0.5 | 0.5 | 0 | 2620 | 10.7 |
| 3 | 55.0 | 30.0 | 15.0 | 1.0 | 1.0 | 0 | 3940 | 7.9 |
| 4 | 55.0 | 30.0 | 15.0 | 10.0 | 5.0 | 0 | 6840 | 5.8 |
| 5 | 55.0 | 30.0 | 15.0 | 25.0 | 15.0 | 0 | 4480 | 5.8 |
| 6* | 55.0 | 30.0 | 15.0 | 30.0 | 25.0 | 0 | 3780 | 6.0 |
| 7 | 35.0 | 60.0 | 5.0 | 10.0 | 5.0 | 0 | 6800 | 4.2 |
| 8 | 55.0 | 40.0 | 5.0 | 10.0 | 5.0 | 0 | 4850 | 5.7 |
| 9 | 65.0 | 20.0 | 15.0 | 10.0 | 5.0 | 0 | 4770 | 5.0 |
| 10 | 52.5 | 20.0 | 27.5 | 10.0 | 5.0 | 0 | 4900 | 2.4 |
| 11* | 55.0 | 30.0 | 15.0 | 0.5 | 0 | 0.5 | 1630 | 8.4 |
| 12 | 55.0 | 30.0 | 15.0 | 1.0 | 0 | 1.0 | 4020 | 5.9 |
| 13 | 55.0 | 30.0 | 15.0 | 10.0 | 0 | 5.0 | 6000 | 4.8 |
| 14 | 55.0 | 30.0 | 15.0 | 25.0 | 0 | 15.0 | 4750 | 4.9 |
| 15* | 55.0 | 30.0 | 15.0 | 30.0 | 0 | 25.0 | 3230 | 4.5 |

TABLE 8-continued

| No. | Principal dielectric composition | | | Subsidiary component | | | Dielectric constant (20° C.) | tan δ (20° C.) [%] |
|---|---|---|---|---|---|---|---|---|
| | PbZrO$_3$ (mol %) | Pb(Ni$_\frac{1}{3}$Nb$_\frac{2}{3}$)O$_3$ (mol %) | Pb(Ni$_\frac{1}{2}$W$_\frac{1}{2}$)O$_3$ (mol %) | PbO (mol %) | NiO (mol %) | WO$_3$ (mol %) | | |
| 16 | 35.0 | 60.0 | 5.0 | 10.0 | 0 | 5.0 | 5940 | 3.5 |
| 17 | 55.0 | 40.0 | 5.0 | 10.0 | 0 | 5.0 | 5590 | 4.7 |
| 18 | 65.0 | 20.0 | 15.0 | 10.0 | 0 | 5.0 | 5020 | 5.7 |
| 19 | 52.5 | 20.0 | 27.5 | 10.0 | 0 | 5.0 | 4550 | 1.8 |

*The asterisked specimens are reference examples.

While specific embodiments of the invention have been illustrated and described herein, it is realized that modifications and changes will occur to those skilled in the art. It is therefore to be understood that the appended claims are intended to cover all modifications and chagnes as fall within the true spirit and scope of the invention.

We claim:

1. A dielectric ceramic composition comprising a principal component represented by the formula $$PbZr_x(Ni_\frac{1}{3}Nb_\frac{2}{3})_y(Ni_\frac{1}{2}W_\frac{1}{2})_zO_3$$

wherein x+y+z=1, and subsidiary components of PbO in an amount of 1.0 to 25.0 mol % and NiO or WO$_3$ in an amount of 1.0 to 15.0 mol %, wherein said subsidiary components are added to a calcined powder of said principal component, and wherein the values of x, y and z fall within ranges represented by a quadrangle ABCD of a ternary system composition diagram of PbZr$_x$(Ni$_\frac{1}{3}$Nb$_\frac{2}{3}$)$_y$(Ni$_\frac{1}{2}$W$_\frac{1}{2}$)$_z$O$_3$, such that the vertices of the quadrangle corresponding to compositions A, B, C, D are represented by the following numerical values:

A is x=35.0, y=60.0, z=5.0;
B is x=55.0, y=40.0, z=5.0;
C is x=65.0, y=20.0, z=15.0;
D is x=52.5, y=20.0, z=27.5; (all units mol %).

2. A dielectric ceramic composition of claim 1, wherein PbO is added in an amount of 1.0 to 25.0 mol % and WO$_3$ is added in an amount of 1.0 to 15.0 mol % to the calcined powder of said principal component.

3. A ceramic capacitor composed of:
a dielectric ceramic composition comprising a principal component represented by the formula $$PbZr_x(Ni_\frac{1}{3}Nb_\frac{2}{3})_y(Ni_\frac{1}{2}W_\frac{1}{2})_zO_3$$

wherein x+y+z=1, and subsidiary components of PbO in an amount of 1.0 to 25.0 mol % and NiO or WO$_3$ in an amount of 1.0 to 15.0 mol %, wherein said subsidiary components are added to a calcined powder of said principal component, and wherein the values of x, y and z fall within ranges represented by a quadrangle ABCD of a ternary system composition diagram of PbZr$_x$(Ni$_\frac{1}{3}$Nb$_\frac{2}{3}$)$_y$(Ni$_\frac{1}{2}$W$_\frac{1}{2}$)$_z$O$_3$, such that the vertices of the quadrangle corresponding to compositions A, B, C, D are represented by the following numerical values:

A is x=35.0, y=60.0, z=5.0;
B is x=55.0, y=40.0, z=5.0;
C is x=65.0, y=20.0, z=15.0;
D is x=52.5, y=20.0, z=27.5; (all units mol %),
and electrodes that can be sintered at 800° to 1000° C. in the atmosphere.

4. A ceramic capacitor composed of:
a dielectric ceramic composition comprising a principal component represented by the formula $$PbZr_x(Ni_\frac{1}{3}Nb_\frac{2}{3})_y(Ni_\frac{1}{2}W_\frac{1}{2})_zO_3$$

wherein x+y+z=1, and subsidiary components of PbO in an amount of 1.0 to 25.0 mol % and NiO or WO$_3$ in an amount of 1.0 to 15.0 mol %, wherein said subsidiary components are added to a calcined powder of said principal component, and wherein the values of x, y and z fall within ranges represented by a quadrangle ABCD of a ternary system composition diagram of PbZr$_x$(Ni$_\frac{1}{3}$Nb$_\frac{2}{3}$)$_y$(Ni$_\frac{1}{2}$W$_\frac{1}{2}$)$_z$O$_3$, such that the vertices of the quadrangle corresponding to compositions A, B, C, D are represented by the following numerical values:

A is x=35.0, y=60.0, z=5.0;
B is x=55.0, y=40.0, z=5.0;
C is x=65.0, y=20.0, z=15.0;
D is x=52.5, y=20.0, z=27.5; (all units mol %),
and electrodes that can be sintered at 800° to 1000° C. in a neutral atmosphere or a reducing atmosphere.

5. A thick film capacitor composed by disposing a dielectric layer made of a dielectric ceramic composition and electrodes that can be sintered at 800° to 1000° C. on a ceramic substrate,
said dielectric ceramic composition comprising a principal component represented by the formula $$PbZr_x(Ni_\frac{1}{3}Nb_\frac{2}{3})_y(Ni_\frac{1}{2}W_\frac{1}{2})_zO_3$$

wherein x+y+z=1, and subsidiary components of PbO in an amount of 1.0 to 25.0 mol % and NiO or WO$_3$ in an amount of 1.0 to 15.0 mol %, wherein said subsidiary components are added to a calcined powder of said principal component, and wherein the values of x, y and z fall within ranges represented by a quadrangle ABCD of a ternary system composition diagram of PbZr$_x$(Ni$_\frac{1}{3}$Nb$_\frac{2}{3}$)$_y$(Ni$_\frac{1}{2}$W$_\frac{1}{2}$)$_z$O$_3$, such that the vertices of the quadrangle corresponding to compositions A, B, C, D are represented by the following numerical values:

A is x=35.0, y=60.0, z=5.0;
B is x=55.0, y=40.0, z=5.0;
C is x=65.0, y=20.0, z=15.0;
D is x=52.5, y=20.0, z=27.5; (all units mol %).

* * * * *